US011100010B2

(12) United States Patent
Craske (10) Patent No.: US 11,100,010 B2
(45) Date of Patent: Aug. 24, 2021

(54) APPARATUS AND METHOD FOR HANDLING MEMORY ACCESS REQUESTS

(71) Applicant: Arm Limited, Cambridge (GB)

(72) Inventor: Simon John Craske, Cambridge (GB)

(73) Assignee: Arm Limited, Cambridge (GB)

( * ) Notice: Subject to any disclaimer, the term of this patent is extended or adjusted under 35 U.S.C. 154(b) by 155 days.

(21) Appl. No.: 16/583,539

(22) Filed: Sep. 26, 2019

(65) Prior Publication Data
US 2021/0097005 A1  Apr. 1, 2021

(51) Int. Cl.
*G06F 12/14* (2006.01)
*G06F 12/02* (2006.01)

(52) U.S. Cl.
CPC ...... *G06F 12/1441* (2013.01); *G06F 12/0292* (2013.01); *G06F 12/14* (2013.01); *G06F 12/145* (2013.01); *G06F 12/1433* (2013.01); *G06F 12/1458* (2013.01); *G06F 12/1483* (2013.01)

(58) Field of Classification Search
CPC .. G06F 12/14; G06F 12/1424; G06F 12/1433; G06F 12/1441; G06F 12/145; G06F 12/1458; G06F 12/1483; G06F 12/1491
See application file for complete search history.

(56) References Cited

U.S. PATENT DOCUMENTS

2006/0004944 A1\* 1/2006 Vij ...................... G06F 12/1491
  711/6
2013/0080726 A1\* 3/2013 Kegel ...................... G06F 21/85
  711/163

FOREIGN PATENT DOCUMENTS

GB  2563884  1/2019

\* cited by examiner

*Primary Examiner* — Reginald G Bragdon
*Assistant Examiner* — Thanh D Vo
(74) *Attorney, Agent, or Firm* — Nixon & Vanderhye P.C.

(57) ABSTRACT

An apparatus and method are provided for performing data processing operations. The apparatus has processing circuitry for performing data processing operations configured to operate in a normal mode and a memory region management mode. A memory is used to store data accessed by the processing circuitry when performing the data processing operations. A memory region table is provided to define accessibility control information for each of a number of memory regions within the memory. An access control mechanism controls access to the memory in response to an access request issued by the processing circuitry, and a memory protection unit providing a bypass indication for one or more memory regions is referenced by the access control mechanism when the processing circuitry is in the memory region management mode. The access control mechanism is arranged to constrain access to the memory location identified by the access request based on the accessibility control information defined in the memory region management mode when the processing circuitry is operating in the normal mode. When the processing circuitry is operating in the memory region management mode, the access control mechanism is arranged to reference the memory protection unit and when the bypass indication is set for the memory region, to process the access to the memory location unconstrained by the memory region table.

16 Claims, 6 Drawing Sheets

APPARATUS AND METHOD FOR HANDLING MEMORY ACCESS REQUESTS

BACKGROUND

The present technique relates to the field of data processing. More particularly the invention relates to handling memory access requests.

Processing circuitry in a data processing apparatus may generate access requests to request access to data stored in memory. For example, the processing circuitry may request to read some data from memory or write some data to memory. Before these requests are passed to the memory system to perform the requested access, the data processing apparatus may perform various functions related to the request. For example, it may be necessary to perform address translation to translate a virtual address specified by the processing circuitry in the access request into a physical address that can be used by the memory system to identify the memory location for which access is requested. The data processing apparatus may also perform access control checks to check whether the processing circuitry should be allowed to access the requested memory location and possibly to constrain how that access is to proceed.

SUMMARY

In one example arrangement, there is provided a data processing apparatus comprising: processing circuitry to perform data processing operations, wherein when performing the data processing operations the processing circuitry is arranged to seek to access data stored in memory; a memory region table to define accessibility control information for each of a number of memory regions within the memory; an access control mechanism to control access to the memory in response to an access request issued by the processing circuitry; wherein the processing circuitry is configured to operate in a normal mode and a memory region management mode; and a memory protection unit referenced by the access control mechanism when the processing circuitry is operating in the memory region management mode, the memory protection unit providing a bypass indication for one or more memory regions in the memory; wherein the access control mechanism is arranged, when the processing circuitry is operating in the normal mode, to constrain access to a memory location identified by the access request based on the accessibility control information defined in the memory region table for a memory region containing the memory location; and wherein the access control mechanism is arranged, when the processing circuitry is operating in the memory region management mode, to reference the memory protection unit, and when the bypass indication is set for the memory region containing the memory location identified by the access request, to process the access to the memory location unconstrained by the memory region table.

In another example arrangement, there is provided a method of operating a data processing apparatus, the method comprising: performing, by processing circuitry, data processing operations; storing data accessed by the processing circuitry when performing the data processing operations in a memory; defining accessibility control information for each of a number of memory regions within the memory in a memory region table; controlling, in response to an access request issued by the processing circuitry, access to the memory by: when the processing circuitry is operating in a normal mode, constraining access to a memory location identified by the access request based on the accessibility control information defined in the memory region table for a memory region containing the memory location; and when the processing circuitry is operating in a memory region management mode, referencing a memory protection unit, the memory protection unit providing a bypass indication for one or more memory regions in the memory, and when the bypass indication is set for the memory region containing the memory location identified by the access request, processing the access to the memory location unconstrained by the memory region table.

In a still further example arrangement, there is provided a data processing apparatus comprising: processing means for performing data processing operations, wherein when performing the data processing operations the processing means is arranged to seek to access data stored in memory means; memory region table means for defining accessibility control information for each of a number of memory regions within the memory means; access control means for controlling, in response to an access request issued by the processing means, access to the memory means; wherein the processing means is configured to operate in a normal mode and a memory region management mode; wherein the access control means is arranged, when the processing means is operating in the normal mode, to constrain access to a memory location identified by the access request based on the accessibility control information defined in the memory region table means for a memory region containing the memory location; and wherein the access control means is arranged, when the processing means is operating in the memory region management mode, to reference a means for protecting memory, the means for protecting memory providing a bypass indication for one or more memory regions in the memory means, and when the bypass indication is set for the memory region containing the memory location identified by the access request, to process the access to the memory location unconstrained by the memory region table means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

In accordance with techniques described herein, there is provided a data processing apparatus comprising processing circuitry to perform data processing operations. While performing these data processing operations, the processing circuitry may need to access data stored in a memory. In order to bring about this access, the processing circuitry may be configured to generate an access request indicating the memory location for which the data to be accessed is stored and any other information that may be needed in order for the request to be carried out. For example, the access request may be a write request and the write request may indicate the memory location to be written to as well as the data that is to be written. Alternative forms of access request include a read request.

The data processing apparatus may be configured to perform access control checks to determine how to constrain the requested access. For example, these checks may determine whether access is allowed to proceed and if it is allowed to proceed, conditions restricting how it is to proceed.

In accordance with the techniques described herein, performance of these checks may involve consulting a memory region table. The memory region table is a table that may be stored in memory and defines accessibility control information for each of a number of memory regions within the memory. As such, in response to an access request generated and issued by the processing circuitry, an access control mechanism of the data processing apparatus may reference the memory region table, identify an entry in the memory region table associated with the location in memory specified by the access request, and based on accessibility control information associated with the memory region, constrain access to the memory location accordingly.

In this way, the memory region table can define for portions of the memory address space, accessibility control information that is to dictate how access to that portion should be constrained. The accessibility control information could take a variety of forms, but in some implementations, the accessibility control information comprises permission information defining which processes executing on the processing circuitry or which privilege levels are allowed to access a given region of memory. Alternatively, or in addition, the accessibility control information may define attribute information indicating how the memory locations associated with the memory region are to be accessed, for example, a cache policy for the memory region or a restriction on speculative reads. In addition, in one example implementation the accessibility control information comprises ownership information identifying, for a given memory region, which process executable by the processing circuitry is an owning process that has control of access to that given memory region, allowing the owning process to control which other processes, if any, can access that given region. The memory region table may also be able to define, for a memory region, that that memory region is private memory that is not to be accessed by the processing circuitry when in a normal mode of operation.

As discussed, the memory region table is configured to define accessibility control information used to constrain access to a memory location identified by an access request. However, in some cases, an additional level of access may be needed to access a region of memory that the memory region table would otherwise prohibit. For example, it may be necessary to perform management operations on the memory region table to change accessibility control information associated with a particular region or to change the definitions of the regions (e.g., to create a new region). Typically, the memory region management table would indicate that the region of memory storing the memory region table is a region of memory to which access is not to be granted. That is, the memory region table is indicated as being stored in private memory. Indeed, in some implementations, the access control checks based on the memory region table and the memory region table itself are not visible to the software running on the processing circuitry. A means for accessing this region of memory in a manner unconstrained from the accessibility control information defined in the memory region table in order to perform memory management operations is therefore desirable.

In accordance with the techniques described herein, the processing circuitry is configured to operate in a normal mode and a memory region management mode. When the processing circuitry is operating in the normal mode, the access control mechanism is arranged to constrain access to the memory based on the accessibility control information defined in the memory region table as described above.

However, when the processing circuitry is operating in the memory region management mode, the access control circuitry is arranged to reference a memory protection unit (MPU) in order to determine whether the access is to be constrained by the accessibility control information defined in the memory region table. The MPU is arranged to store a bypass indication for regions of memory, which when set for a given memory region, indicates that the memory region table is not to be used to constrain access to the memory location identified by the access request if it falls within that given memory region. Hence, if the MPU stores an entry for a memory region containing the memory location identified by the access request and the bypass indication in the MPU for the memory region is set, then the access control mechanism is arranged to process the access to the memory location unconstrained by the memory region table. If the bypass indication for such a memory region is unset, the access control mechanism may be arranged to reference the memory region table and constrain access to the memory location based on the accessibility control information defined therein.

In this way, access to memory can be policed using the accessibility control information defined in the memory region table, providing a layer of security which can be used to block accesses by processes on the processing circuitry to regions of memory that they should not access. Such access requests may arise accidentally or as a result of malicious behaviour. Thus, the techniques described herein restrict such inappropriate access while also providing a mechanism for the processing circuitry when operating in the memory region management mode to perform certain accesses unconstrained by the content of the memory region table. This for example allows the processing circuitry when operating in the memory region management mode to access memory regions considered to be private memory reserved for use by the processing circuitry when operating in the memory region management mode, unconstrained by the access rights indicated in the memory region table.

In some implementations, the bypass indication is a bit having a first predetermined value (e.g., one) to indicate that a bypass of the memory region table should occur, and having a second predetermined value (e.g., zero) to indicate that the memory region table should be used to constrain the access. When the processing circuitry is operating in the memory region management mode, the access control mechanism is arranged to reference the MPU to determine whether the access should be constrained by the accessibility control information in the memory region table. By implementing the bypass indication using a single bit, the amount of data to be stored in the MPU to implement these techniques can be kept small.

In some implementations, the memory region table and the access control checks performed by the access control circuitry based on the memory region table may not be visible to the processes running on the processing circuitry. In an example, the processing circuitry executes processes to implement application software, virtual machines, and a hypervisor, each of which operates at an associated exception (or privilege) level. In conventional systems, access control to memory may be controlled ultimately by the hypervisor, since the hypervisor can control which regions of memory each virtual machine has access to and each virtual machine can control which regions of memory each application has access to, typically these controls being implemented using multi-stage address translation. However, this approach relies on the hypervisor being trusted since the hypervisor has the highest privilege level and overall control of access.

In order to avoid this requirement, in some implementations the access control mechanism is arranged to constrain the access based on the memory region table, whose contents can be controlled by the processing circuitry when operating at a higher privilege level than that of even the hypervisor, this higher level being implemented by the memory region management mode. In such implementations, if a given process issues an access request specifying a memory location for which the memory region table indicates that given process does not have appropriate permission, the access control mechanism is arranged to deny access to the memory location. This can occur even if the process in question is one run by the hypervisor. For example, it may be that the hypervisor is not permitted to directly access regions in memory considered as private memory of the processing circuitry when operating in the memory region management mode, such as the call stack used by the processing circuitry when operating in that mode, or the memory region table. Further, in an implementation where the accessibility control information comprises ownership information identifying, for a given memory region, which process executable by the processing circuitry is an owning process that has control of access to that given memory region, the owning process may be at a lower exception level than the hypervisor but still cause the hypervisor to be prevented from accessing the given memory region, by causing the processing circuitry when operating the memory region management mode to set the contents of the memory region table for that given memory region accordingly. In this way, access control can be implemented to police accesses performed by the processing circuitry without trusting the hypervisor to have overall control of access rights and consequently improving security.

As used herein, the term constrained refers to the way in which the access to the memory is policed whereby it is determined whether an access is allowed to proceed or not and if the access is allowed to proceed, any restriction that may apply regarding how the access is to proceed.

An example of when the processing circuitry is configured to operate in the memory region management mode is when the processing circuitry is maintaining the accessibility control information stored in the memory region table. The accessibility control information associated with the memory region storing the memory region table indicates that modification of this table is not allowed. This is the case because it is desirable for software executed by the processing circuitry whilst in the normal mode of operation not to be able to directly modify the permissions in the memory region table as this could undermine the security provided by the presence of the memory region table. However, during operation, it may be that the contents of the memory region table need to be maintained. This could involve changing the permissions for a given memory region or redefining memory regions by creating a new memory region or adjusting the size of a memory region, for example. To enable such a modification, the processing circuitry is configured to perform these operations while in the memory region management mode. Then, in accordance with the technique described herein, in response to the access request, the access control mechanism first references the MPU. In such implementations, the MPU has the bypass indication set for the memory region storing the memory region table and so the access control mechanism is arranged to process the access to the memory location identified by the access request unconstrained by the memory region table. Hence, memory region management operations can be performed on the memory region table whilst still restricting access to the memory region table when the processing circuitry is not performing such operations.

In one example implementation, in addition to the accessibility control information defined in the memory region table, the MPU additionally defines further accessibility control information. As discussed, when the processing circuitry is operating in the memory region management mode, the access control circuitry is arranged to reference the MPU. In the case where the access control circuitry identifies that the bypass indication is set in the MPU for a memory region to be accessed, the access control circuitry may be arranged to either always allow the access to be performed, or alternatively may control access to the memory location identified by the access request taking into account the further accessibility control information defined in the MPU. Hence, since the bypass indication is set and the access control mechanism is arranged not to constrain the access using the memory region table, the MPU can provide an alternative way to instruct the access control mechanism as to the constraints that should be enforced when processing the access to memory.

However, whilst the setting of the bypass indication in the MPU for one or more memory regions allows the processing circuitry when operating in the memory region management mode to access those one or more memory regions without being constrained by the contents of the memory region table, it is not always the case that all accesses performed by the processing circuitry when operating in the memory region management mode should be unconstrained. For instance, the processing circuitry may be operating in the memory region management mode in order to undertake certain tasks on behalf of a process run by the processing circuitry when in the normal mode of operation. In such instances it may be appropriate for the accesses to still be constrained by the contents of the memory region table. Thus, in one implementation, when the processing circuitry is operating in the memory region management mode and the bypass indication is unset for the memory region in question, the access control mechanism may be arranged to take into account the accessibility control information defined in the memory region table to control access to the memory location. According to such an implementation, when the bypass indication does not indicate that the memory region table is to be bypassed, the access control mechanism is arranged to use the memory region table to determine whether the access is to proceed and if so, any conditions to constrain how the access is to proceed. This approach therefore makes use of the accessibility control information to provide security when the processing circuitry is in the memory region management mode but the bypass indication is unset.

In an example implementation in which the MPU defines further accessibility control information, when the processing circuitry is operating in the memory region management mode and when the bypass indication is unset, the access control mechanism may be arranged to control access to the memory location identified by the access request taking into account a combination of the accessibility control information defined in the memory region table and the further accessibility control information defined in the memory protection unit. In one example implementation, the combination is determined by selecting the most stringent control information of the accessibility control information and the further accessibility control information. By processing the access based on information in both the MPU and the memory region table when the bypass indication is unset, the data processing apparatus is able to take account of security concerns that may be indicated by either the MPU or the memory region table.

In some example implementations, the combination of the accessibility control information and the further accessibility control information is determined by combining at least one of permission information and attribute information from the further accessibility control information with the accessibility control information. Each of the accessibility control information and the further accessibility control information may comprise a number of types of control information. For example, they may comprise permission information indicative of who is allowed to access the memory location and what operations they are allowed to perform on it. Additionally, or alternatively they could comprise attribute information dictating how access to that memory location is to be carried out such as a restriction on speculative accesses or a caching policy for that memory location indicative of whether the memory location is allowed to be cached and if so, whether it should be cached in a write-back manner or a write-through manner for example.

In an example implementation, the further accessibility control information defined in the MPU comprises at least one of permission information and attribute information that is combined with the accessibility control information from the memory region table. As such, when the processing circuitry is operating in the memory region management mode and the bypass indication is unset, the access is constrained by both the accessibility control information from the memory region table as well as at least one of permission information and attribute information from the MPU.

As described above, the accessibility control information could comprise a number of types of control information including permission information and attribute information. According to some example implementations, in addition to or instead of the permission information and attribute information, the accessibility control information defined in the memory region table defines ownership information. The ownership information indicates for a given memory region, which of a plurality of processes executable by the processing circuitry is an owner process that has control of access to the given memory region. In some implementations, the memory region table may identify one or more memory regions as being private memory regions accessible only when in the memory region management mode. When the memory region table identifies a memory region table that is not private memory, the memory region table may define ownership information for that memory region. In this way, the memory region table can define ownership information for the memory regions that are expected to be accessed when the processing circuitry is in the normal mode while indicating some memory regions as only to be accessed when in the memory region management mode.

By storing ownership information of the above type, the data processing apparatus is able to avoid a situation whereby processes are arranged according to privilege levels with processes executing at a given privilege level having access to all memory regions associated with processes having a lower privilege level. Therefore, by way of example, a process implementing an untrusted hypervisor can be prevented from accessing data associated with a process implementing application software. This can be achieved since a given process of a lower privilege level can prevent processes of a higher privilege level from accessing data owned by that given process. The ownership information can take one of a number of states. For instance, the ownership information may indicate that data stored in the memory region is only allowed to be accessed by the owner process. Alternatively, the ownership information may indicate that the data is allowed to be accessed by certain other processes or alternatively by any process executable on the processing circuitry. The ownership information may be changed, for example, to restrict access from all processes to solely the owner process. Thus, by implementing this scheme, instead of having a top-down hierarchy of access control whereby each process is able to control the access to data by the processes lower in the hierarchy, processes executable on the processing circuitry are able to selectively restrict access by processes of all levels.

As a specific example of an environment operating with owner processes that have control of access to a given memory region, the processing circuitry may be arranged to be operable in a plurality of realms, whereby when operating in a given realm, the processing circuitry is executing an associated process that has control of access to a block of physical addresses forming an associated memory region. In this case, the ownership information comprises realm information identifying the realm associated with the given memory region. In such a realm-based environment, a given memory region may be associated with an owner realm specified from multiple realms, where each realm corresponds to a portion of at least one software process, such as a virtual machine or hypervisor, which may be an untrusted hypervisor. Processing circuitry processes software processes at one of a plurality of exception levels associated with different levels of privilege. The owner realm has a right to exclude other realms from accessing data stored within the given memory region, i.e. the owner realm has exclusive rights to control access. Such an approach can improve security, since it provides a mechanism via which a process at a lower level of privilege can prevent access to a particular region of memory by a process having a higher level of privilege, and hence does not rely on making an assumption that software at a higher level of privilege has to be more trusted than software at a lower level of privilege.

To log which processes have ownership of which realms and record which other realms to which the owner realm has granted access, the memory region table stores realm information identifying the realm with which the memory region is associated. When the access control mechanism references the memory region table, the access control mechanism may be arranged to determine whether the owner process indicated in the realm information matches the process from which the access request was generated or whether the realm information otherwise indicates that the originating process is permitted to access the memory region. The access control circuitry may be arranged to process the access based on this information.

In accordance with one example implementation, the processing circuitry may be provided with a realm management unit to carry out realm management operations when the processing circuitry is operating in the memory region management mode. In some cases the realm management unit comprises dedicated circuitry for performing realm management operations. Alternatively the realm management unit may be implemented by microcode running on the processing circuitry whilst in the memory management mode. By providing a distinct realm management unit for performing realm management operations, the operations to be performed when in the memory region management mode can be separated from those to be performed when in the normal mode. Hence, the access control mechanism can more easily determine, based on the origin of an access request, whether it originated from processing circuitry operating in the normal mode or the memory region management mode.

When performing the realm management operations, the realm management unit may be arranged to issue an access request to modify the accessibility control information defined in the memory region table. For instance, this could involve modifying the realm information by changing ownership information associated with a realm, information indicative of which processes the owner process has shared a realm with, permission information, or attribute information. When performing the realm management operations, the processing circuitry is in the memory region management mode and so the access control mechanism is arranged to reference the MPU. To ensure that the processing circuitry in the normal mode cannot access the memory region table but that the processing circuitry in the memory region management mode can access the memory region table, the memory region table indicates that access to the memory regions storing the memory region table is not to be allowed and the bypass indication in the memory protection unit is set for each memory region storing the memory region table. Therefore, when the access control mechanism references the MPU, the access control mechanism determines that the access is to be handled unconstrained by the memory region table. Therefore, access to the memory regions storing the memory region table can be restricted only to the processing circuitry in the memory region management mode and accidental or maliciously inclined access can be restricted when the processing circuitry is operating in the normal mode.

In a similar manner as for the memory regions storing the memory region table, the bypass indication in the MPU may be set for each memory region storing code executed by the realm management unit and the call stack and heap used by the realm management unit when performing the realm management operations. The memory region table can then be arranged to indicate that the memory region storing this code is not to be accessed. That is, the memory region table indicates that these regions correspond to private memory. As such, when performing the realm management operations, the realm management unit can access the code defining its behaviour unconstrained by the memory region table. Therefore, the code to implement the realm management operations can be hidden from the normal processes executable on the processing circuitry whilst still allowing access to the code by the realm management unit. For more information on realm management within a realm-based system, the reader is referred to UK published patent application GB 2563884 A, the contents of which are incorporated herein by reference.

In accordance with the techniques described herein, in some example implementations, a further level of access check is performed to ensure that the regions of memory accessed when the processing circuitry is operating in normal mode are regions that are expected to be accessed by processing circuitry in the normal mode. The data processing apparatus is therefore able to ensure that the regions of memory that should only be accessed when the processing circuitry is operating in the memory region management mode are only accessed when the processing circuitry is operating in the memory region management mode. This provides an additional check to ensure that the approach for handling accesses for one mode is not used for data that is expected to be accessed in the other.

Particularly, the further access checks may identify if an access request to a region of private memory has somehow been allowed despite originating from the processing circuitry in normal mode. This may occur if the memory region table is setup wrongly or a fault occurs with the access control mechanism, for example. Additionally, or alternatively, the data processing apparatus may be able to identify when the processing circuitry operating in the memory region management mode is attempting to access a region of memory that is not private and for which the access is unconstrained by the memory region table which could indicate a fault. This could occur if the bypass indication in the MPU were incorrectly set for that memory region. Thus, a mechanism is provided for identifying when access is to be processed in a manner that is erroneously unconstrained by the memory region table. For example, this could indicate that a process that executes on the processing circuitry in the normal mode has accidentally or maliciously managed to cause an access that should be performed with the processing circuitry in the normal mode instead to be handled on its behalf by the processing circuitry operating in the memory region management mode but without being constrained by the memory region table.

To implement the above-described further access checks, in some implementations of the techniques described herein, the data processing apparatus is provided with memory access circuitry to access data stored in a memory location identified by an access request received from the access control mechanism. After the access control mechanism has processed the access, if the access control mechanism determines that the access request is allowed to occur, the access control mechanism is arranged to propagate the access request from a core to the memory access circuitry. The access request specifies a bypass performed indication indicative of whether the access control mechanism processed the access to the memory location constrained by the memory region table. The bypass performed indication may be implemented as a single bit having a first value (e.g., zero) to indicate that the access was constrained by the memory region table and a second value (e.g., one) to indicate that the access was processed unconstrained by the memory region table.

In response to the received access request, the memory access circuitry is arranged to determine an expected bypass performed indication based on the memory location identified by the access request received from the core. In some examples this is done by determining whether the memory location is a memory location that corresponds to private memory. Private memory may be memory storing the memory region table, code to perform memory management operations, and/or the call stack or heap being used by the processing circuitry when in the memory management mode, for example. The expected bypass indication may be set to indicate that accesses to private memory are expected to have been processed unconstrained by the memory region table and accesses to regions of memory other than private memory have been processed constrained by the accessibility control information in the memory region table.

When the bypass performed indication differs from the expected bypass performed indication, the memory access circuitry may be arranged to deny access to the memory location. Additionally, or alternatively, the memory access circuitry could be arranged to raise an exception or invoke another fault handling procedure. However, by denying access to the memory location, the memory access circuitry can ensure that an access that appears suspicious is not allowed to take place.

In some cases, it may be desirable to provide a data processing apparatus wherein the above-described functionality can be selectively enabled and disabled. By doing this, it may be that data access can be performed more quickly when the memory region table check does not have to be performed and all accesses can be processed unconstrained by the memory region table. In such cases, it may be determined that sufficient memory access control is already implemented in a manner that does not involve the memory region table. This may be performed alongside address translation, for example. It could be determined that the hypervisor is trusted to implement appropriate access control and that consulting the accessibility control information is not needed and so the performance benefits outweigh the additional security of the above-described techniques. However, when operating with an untrusted hypervisor, it may be determined that the security provided by the accessibility control information is required.

In order to provide this selection, the data processing apparatus may be provided with an access control flag, wherein when the access control flag is clear, the access control mechanism is disabled and access to the memory is not constrained by the memory region table. In this case, the processing circuitry may be prohibited from operating in the memory region management mode. Conversely, when the access control flag is set, the access control mechanism is configured to constrain access to the memory in dependence on the mode of the processing circuitry, the bypass indication in the MPU, and the memory region table.

Specific examples will now be described with reference to the figures.

Figure 1:
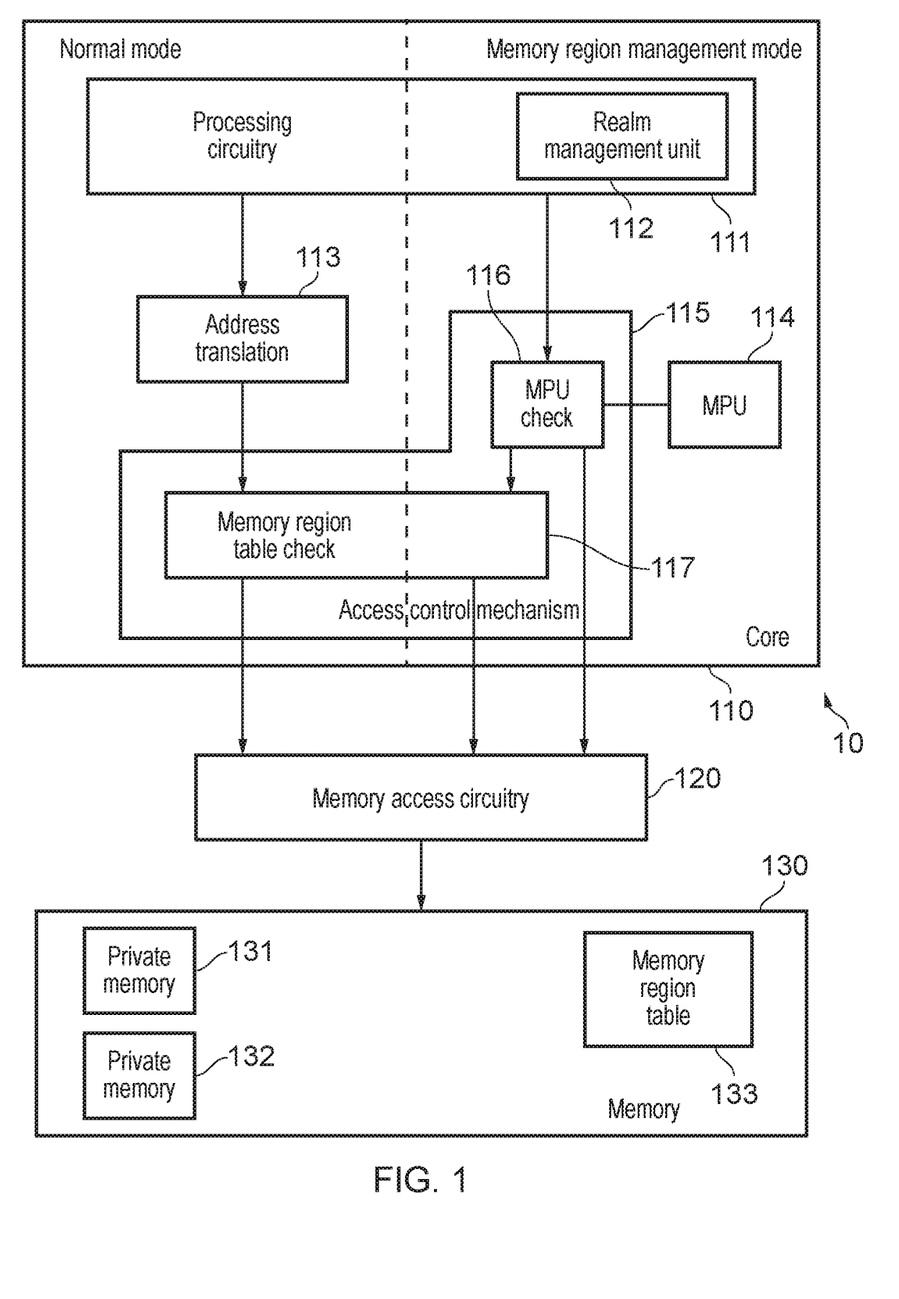
FIG. 1 is a block diagram of a data processing apparatus in accordance with one example implementation.

FIG. 1 is a block diagram of a data processing apparatus 10 in accordance with one example implementation. On a core 110 of the data processing apparatus 10 processing circuitry 111 is provided. The processing circuitry 111 performs data processing operations, some of which require the processing circuitry 111 to access data stored in a memory 130. The processing circuitry 111 is configured to operate in a normal mode for performing standard data processing operations and a memory region management mode to perform memory region management operations and other operations that require access to regions of private memory 131, 132, 133. At least some of the memory region management operations are realm management operations and the processing circuitry 111 incorporates a realm management unit 112 which performs the realm management operations when the processing circuitry 111 is in the memory region management mode.

In order to access data stored at a memory location in the memory 130, the processing circuitry 111 is arranged to generate a memory access request identifying the memory location associated with the data to be accessed.

Although FIG. 1 depicts a memory 130, in some implementations this can be considered to refer to an entire memory system. Therefore, whilst the access request identifies a memory location for the data to be accessed, the data may be stored in a cache forming part of the memory system and storing a cached copy of the data for the specified memory location.

When the processing circuitry 111 is operating in the normal mode, depending on the process being executed by the processing circuitry 111, the access request can identify the memory location by specifying a virtual address (VA), an intermediate physical address (IPA), or a physical address (PA) of the memory location. Therefore, when the access request specifies a VA or an IPA, the data processing apparatus is arranged to perform address translation 113 on the VA or IPA to determine the corresponding PA. When the address translation 113 is performed, the circuitry performing the translation is also configured to perform a check as to whether the process being executed has permission to access the requested memory location. In one example of this, the operating system of a virtual machine facilitates a check as to whether application software has the appropriate permission and a hypervisor facilitates a check as to whether the virtual machine has the appropriate permission to access the requested memory location.

Having performed the address translation 113, if the access request has not been denied during the address translation, the access request is forwarded to an access control mechanism 115.

When the processing circuitry 111 is operating in the memory region management mode, the access request identifies the memory location using a PA and so no address translation 113 is required. Therefore, the access request is forwarded to the access control mechanism 115 without undergoing address translation 113.

When the access request received by the access control mechanism 115 originates from the processing circuitry 111 operating in the normal mode, the access control mechanism 115 is arranged to reference a memory region table 133 stored in memory 130 to determine how the access should be constrained. This memory region table check 117 identifies in the memory region table 133 an entry corresponding to the memory region containing the memory location identified by the request. The memory region table 133 can be arranged to store accessibility control information associated with each memory region and so the relevant accessibility control information for the identified memory location can be determined.

The accessibility control information defines how the access is to be constrained. For example, the accessibility control information could define permission information or attribute information. In the example depicted in FIG. 1, the accessibility control information comprises realm information. As discussed earlier, in a realm-based environment, additional security can be achieved by not needing to rely on software at a higher privilege level necessarily being more trusted than software at a lower privilege level. Instead, any particular memory region can be associated with an owner realm, where that realm corresponds to a software process or a portion thereof. The owner realm has a right to exclude other realms from accessing data stored within its identified memory region, even if those other realms relate to software at a higher privilege level. In systems that employ a hypervisor, this for example, can be used to manage security of data within the system, even in instances where the hypervisor is an untrusted hypervisor.

The memory region table check 117 therefore determines whether the process executing on the processing circuitry is allowed to access the realm containing the requested memory location. The process could be allowed to access the realm because the process is the owner process of the realm, because it is a process indicated in the realm information as one allowed to access the realm, or because the realm information indicates that all processes are allowed to access the realm, for example. The memory region table 133 may alternatively indicate the memory region is a region of private memory that is not to be accessed at all when operating in the normal mode.

In some implementations, the memory region table check 117 may only detect whether the access is allowed to be performed. Additionally, or alternatively, the memory region check 117 may determine other factors by which the access to the memory 130 is to be constrained. In the implementation depicted in FIG. 1, the memory region table check 117 also determines how the access is to proceed. That is, the memory region table check 117 may determine that the access is to be constrained by a cache policy or a restriction on speculative reads, for example.

Having processed the access to the memory location constrained by the accessibility control information, the access control mechanism 117 is arranged to propagate the access request from the core 110 to memory access circuitry 120.

In response to an access request when the processing circuitry 111 is operating in the memory region management mode, the access control mechanism 115 is arranged to reference an MPU 114 as part of an MPU check 116. The MPU 114 could be arranged to store any number of entries which could be a fixed number for the data processing apparatus or could vary in dependence on the number of memory regions that are to be defined. In the example depicted in FIG. 1, the MPU 114 is configured to store a fixed number of entries, and in this case the fixed number is eight, although it will be appreciated that in other examples the fixed number could be a different number. By using only eight entries, the storage space required in the MPU 114 can be kept small, the MPU 114 can be referenced quickly, and enough entries are provided to define the memory regions required by the data processing apparatus 10 when operating in the memory region management mode.

If a bypass indication is set for the memory region containing the memory location identified by the access request, the access control mechanism 115 is arranged to process the access bypassing the memory region table check 117 and instead propagate the request to the memory access circuitry 120. Thus, the access is processed unconstrained by the memory region table 133. The bypass indication could take a number of forms but in the implementation depicted in FIG. 1, the bypass indication is a single bit in the MPU entry corresponding to the memory region. If the value of the bit is one, the bypass indication is set and the memory region table check 117 is omitted. Conversely, if the value of the bypass indication bit is zero, the bypass indication is unset and the access control mechanism 115 is arranged to carry out the memory region table check 117 described above for the access request.

In summary, when the processing circuitry 111 is operating in the normal mode, the access control mechanism 115 is arranged to perform the memory region table check 117. However, when the processing circuitry 111 is operating in the memory region management mode, the access control mechanism 115 is arranged to determine whether the memory region table check 117 is to be carried out or whether the memory region table check 117 should be bypassed.

In the implementation depicted in FIG. 1, in response to an access request received from the access control mechanism 117 of the core 110, the memory access circuitry 120 is arranged to access the data stored in the memory 130, for example by writing that data to the specified memory location for a write access request, or returning the requested data read from the specified memory location to the processing circuitry 111 for a read request.

However, in alternative implementations, when the access control mechanism 117 propagates the access request from the core 110 to the memory access circuitry 120, the access request specifies a bypass performed indication indicative of whether the access was processed constrained by the memory region table check 117 or if the memory region table check 117 was bypassed. The memory access circuitry 120 is arranged so that in response to receiving the access request, the memory access circuitry 120 determines an expected bypass performed indication based on the memory location identified by the access request. If the memory location is in a region of private memory 131, 132, 133, the expected bypass indication is set to indicate that the memory access circuitry 120 expects that the memory region table check 117 has been bypassed. Conversely, if the memory location is in a region that is not determined to be private memory 131, 132, 133, the expected bypass indication is set to indicate that the memory access circuitry 120 expects that the memory region table check 117 has been performed.

If the bypass performed indication matches the expected bypass performed indication, the memory access circuitry 120 is arranged to access the data stored in memory 130. However, if the bypass indication differs from the expected bypass indication, the memory access circuitry 120 is arranged to not permit access to the memory 130.

Figure 2:
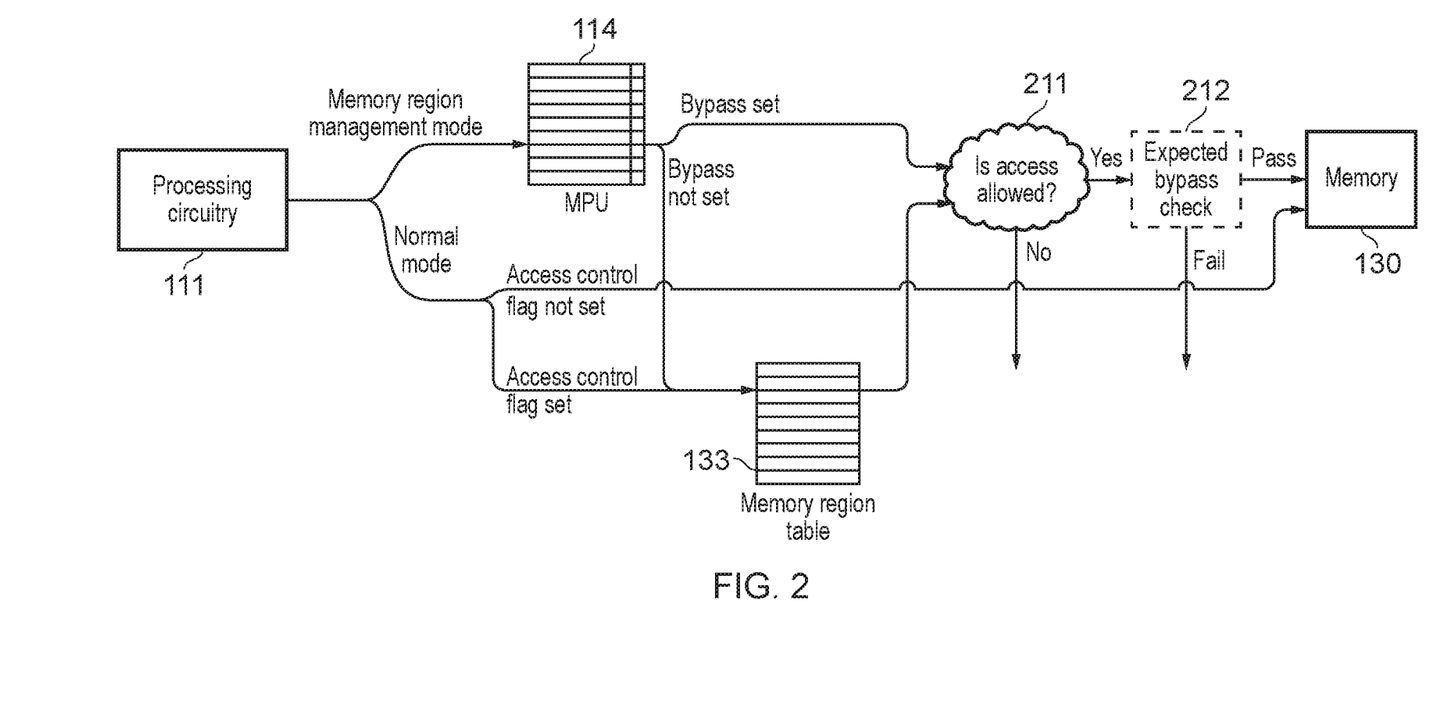
FIG. 2 is a schematic illustrating the logical flow by which an access request is handled in accordance with one example implementation.

FIG. 2 is a schematic illustrating the logical flow by which an access request is handled in accordance with one example implementation. The implementation depicted in FIG. 2 makes use of an access control flag to selectively enable and disable the memory region table check 117.

The processing circuitry 111 is arranged to generate an access request to request access to data stored in memory 130. As discussed above, the processing circuitry 111 is able to operate in a normal mode and a memory region management mode. However, if the access control flag is clear or not set, the processing circuitry 111 is arranged to operate only in the normal mode.

If the processing circuitry is operating in the normal mode, the logical flow by which an access request generated by the processing circuitry 111 is handled proceeds from the processing circuitry 111 as shown in FIG. 2 and along the lower branch. If the access control flag is not set, the flow then proceeds to the memory 130 as the access control mechanism 117 permits the access. Not pictured in FIG. 2 are any access control steps other than those performed with reference to the memory region table and the MPU that may be carried out. If the access control flag is set, the access control mechanism is arranged to determine how the access should be constrained based on consulting the memory region table 133.

Returning to the access request as it is issued by the processing circuitry 111, if the processing circuitry 111 is in the memory region management mode, the memory location identified by the access request is looked up in the MPU 114.

If the bypass indication in the MPU 114 corresponding to the memory region containing the memory location identified by the access request is set, access to the memory location may be constrained by further accessibility control information defined in the MPU 114. According to the implementation depicted in FIG. 2, the further accessibility control information comprises both attribute information and permission information. The access to the memory when in the memory region management mode is constrained by this further accessibility control information when the bypass indication is set.

When the bypass indication is not set, the access may be constrained by a combination of both the further accessibility control information defined in the MPU 114 and the accessibility control information defined in the memory region table 133.

If the access control mechanism 115 determines at step 211 shown in FIG. 2 that the access is not allowed based on either the memory region table 133, the MPU 114, or both the memory region table 133 and the MPU 114, the access request does not proceed any further and is denied. In some implementations, the access control mechanism 115 is configured to raise an exception if this occurs or otherwise indicate to the processing circuitry 111 that the access has been denied.

If the access control mechanism 115 determines that access is allowed, the access request is propagated from the core 110. In some implementations the expected bypass check 212 described above is performed. If the expected bypass performed indication does not match the bypass performed indication, the expected bypass check 212 is failed and the access is denied. In a similar manner to the access being denied by the access control mechanism 115, if the expected bypass check 212 is failed, an exception may be raised or an indication to the processing circuitry 111 that the access is denied otherwise be provided.

For examples implementing the expected bypass check 212, if the check is passed, or for examples not implementing the expected bypass check 212, if the access has been allowed by the access control mechanism 115, then the memory access circuitry 120 is arranged to handle the access and hence access the data at the address indicated by the processing circuitry 111. FIG. 2 schematically illustrates the access request being processed with respect to memory 130. Whilst this could involve accessing the data stored in main memory, this could alternatively involve accessing a cached copy of the data in a cache of the memory system.

Figure 3A:
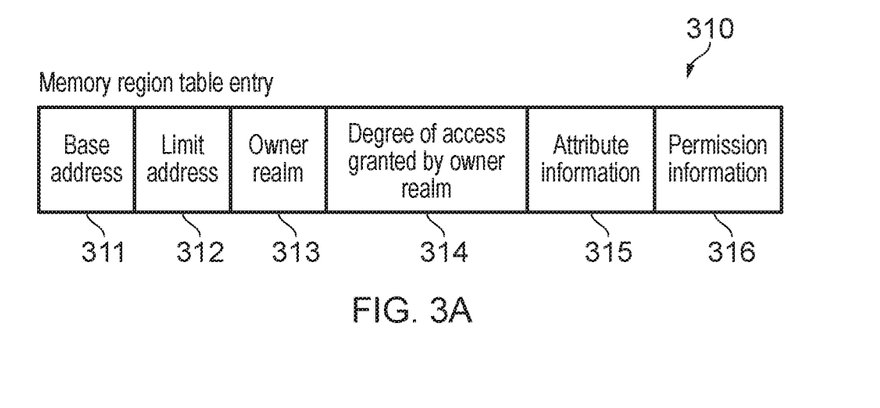
FIG. 3A illustrates the structure of an entry in a memory region table in accordance with one example implementation.

FIG. 3A illustrates the structure of an entry 310 in a memory region table 133 in accordance with one example implementation. The entry 310 comprises a plurality of fields by which the entry that corresponds to a memory location identified by an access request and the accessibility control information to be applied to the memory region associated with the entry 310 can be identified.

While there are a number of ways of indicating the range of physical addresses to which the entry 310 corresponds, in the example depicted in FIG. 3A the physical addresses forming the lower and upper bounds of the range of physical addresses are stored as the base address 311 and the limit address 312. Accordingly, any memory location having a physical address in the region bounded by the base address 311 and the limit address 312 falls within the memory region represented by the entry 310.

The entry 310 further comprises a field indicating an owner realm 313 which has control over access to the memory region including the right to exclude processes executing outside the owner realm 313 from accessing the data stored in the realm. The entry 310 is also provided with a field to indicate the degree of access granted by the owner realm 314. This may indicate that the owner realm 313 is the only realm permitted to access the memory region, that realms above or below the owner realm in a realm hierarchy are able to access the memory region, or that any realm (including a root realm that represents processes that are not considered to be executing in any other realm) are allowed to access the memory region.

Fields are also provided to store attribute information 315 to control how access to the memory location is to occur and permission information 316 used to determine whether the access is allowed to occur. The fields 313, 314, 315, 316 may be considered accessibility control information although different combinations of ownership information, attribute information, permission information, and other forms of accessibility control information could be used.

In an example implementation of the techniques describe herein, the memory region table entry 310 depicted in FIG. 3A is used for the memory regions not corresponding to private memory. For memory regions that do correspond to private memory 131, 132, 133 that should only be accessed by the processing circuitry 111 when operating in the memory region management mode, an alternative form of memory region table entry is used. The alternative memory region table entry defines the base address 311 and the limit address 312 in a similar manner to the entry 310 of FIG. 3A. However, the alternative memory region table entry further comprises an indication that the memory region is a private memory region 131, 132, 133 and so access should not be provided to that private memory region 131, 132, 133 unless the processing circuitry is operating in the memory region management mode. The alternative memory region table entry can also include certain permission and attribute information if desired, but by using the bypass indication in the MPU as discussed earlier, this can avoid the processing circuitry when operating in the memory region management mode from being constrained by such permission and attributes when performing certain operations in respect of those private memory regions.

Figure 3B:
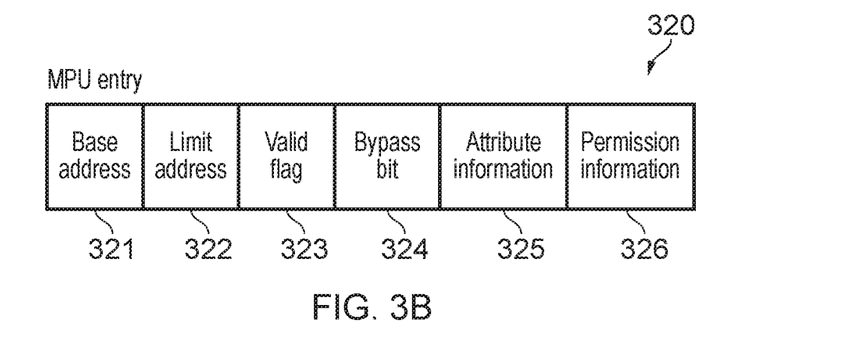
FIG. 3B illustrates the structure of an entry in a memory protection unit in accordance with one example implementation.

FIG. 3B illustrates the structure of an entry 320 in an MPU 114 in accordance with one example implementation. In a similar manner to that explained with reference to FIG. 3A, the extent of the memory region associated with the entry 320 in the MPU 114 is indicated using a base address 321 and limit address 322 although it will be appreciated that other schemes for indicating the memory region could be used.

The entry 320 further comprises a valid flag 323. In the implementation according to FIG. 3B, the MPU 114 has a fixed number of entries. As such, if the number of memory regions in use is smaller than the number of entries in the MPU 114 the valid flag 323 can be used to indicate whether the entry 320 is an entry 320 that corresponds to a memory region in use or whether the entry 320 is to be ignored.

A bypass bit 324 in the entry 320 acts as the bypass indication described earlier. If the bypass bit 324 has a value of one, this indicates that the memory region table 133 is not to be consulted to constrain access to the memory 130. However, if the bypass bit has a value of zero, this indicates that the access is to be constrained by the accessibility control information defined in the memory region table 133.

In this implementation, the MPU entry 320 also defines further accessibility control information 325, 326 in the form of attribute information 325 and permission information 326. This may be used to constrain access to the memory region associated with the MPU entry 320 either on its own, or in combination with accessibility control information defined in the memory region table 133.

Figure 4:
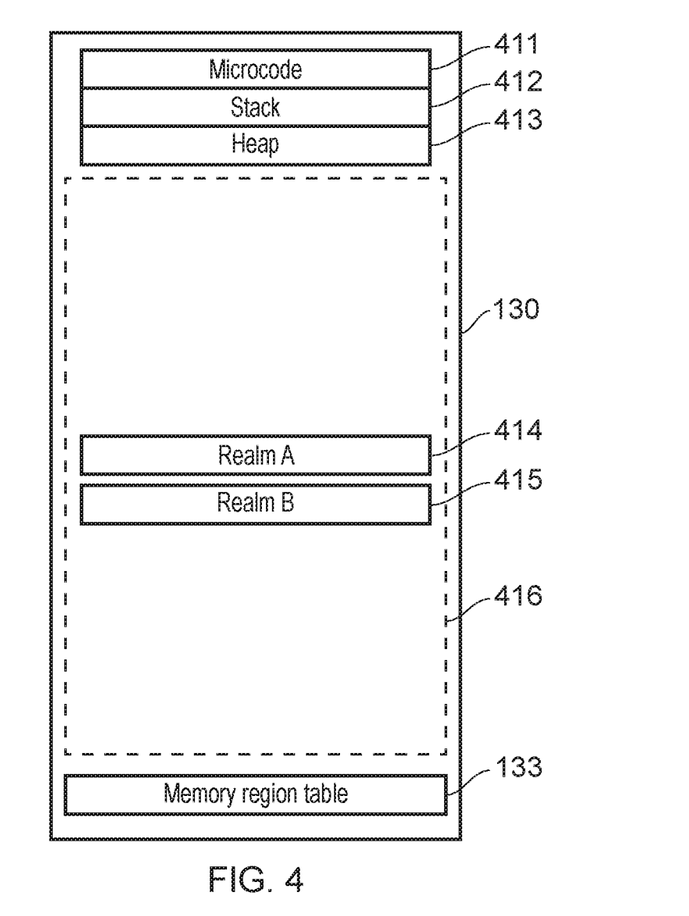
FIG. 4 schematically illustrates the allocation of realms in memory in accordance with one example implementation.

FIG. 4 schematically illustrates allocation of realms in memory 130 in accordance with one example implementation. The entries in the memory region table 133 define memory regions in the memory 130. In the implementation depicted in FIG. 4, the accessibility control information in the memory region table 133 may comprise realm information and so some of the memory regions can be considered to be realms 414, 415. As such, the block of physical addresses indicated in such entries of the memory region table 133 relate to realms 414, 415.

As shown in FIG. 4, the memory region table 133 lies outside the physical address space 416 accessible by the processing circuitry in normal mode. The corresponding entry in the memory region table 133 can indicate that this block of physical addresses is private and hence not to be accessed by the processing circuitry when operating in normal mode, thus preventing any processes running in normal mode from accessing the memory region table 133. Since the memory region table 133 is not accessible to processes executing in normal mode, the memory region table 133 can be considered private memory.

Other examples of private memory depicted in FIG. 4 are the memory regions containing microcode 411, the stack 412, and the heap 413. Similarly, these are situated outside the physical address space 416 accessible by the processing circuitry in the normal mode. The microcode 411 contains the instructions for handling memory region management operations and so it is desirable to prevent access to this code from processes executing on the processing circuitry 111 when in normal mode. The stack 412 and heap 413 are private regions of memory used by the processing circuitry 111 when running in the memory region management mode.

Whilst the regions of private memory 411, 412, 413, 133 in FIG. 4 are shown as being outside the physical address space 416 accessible by the processing circuitry in the normal mode, there may be regions of memory inside the physical address space 416 accessible by the processing circuitry in the normal mode 416 that are at least temporarily marked as private memory. This could occur because the processing circuitry 111 operating in the memory region management mode is arranged to temporarily designate such regions as private memory in order to prevent the processing circuitry 111 in the normal mode accessing them. Accordingly, the processing circuitry 111 operating in the memory region management mode can modify the entry in the memory region table 133 corresponding to the region to indicate that the memory region is a private memory region. After the processing circuitry 111 operating in the memory region management mode has undertaken the required tasks in respect of such a memory region, it can re-designate the memory region as no longer being private, and could for example allocate it to a realm.

Realm A 414 and realm B 415 provide realms owned by processes operating on the processing circuitry 111 in normal mode. For example, the realms 414, 415 may be owned by processes implementing application software. It may be important for the application software that untrusted software running in other processes on the data processing apparatus 10 cannot access the data owned by that process. In a system where access control is implemented based on privilege levels instead of using realms, the process may be able to prevent other processes of the same privilege level from accessing the data, but an operating system or hypervisor of a higher privilege level would have access to this data. However, in the implementation described herein, the process implementing the application software can provision realms 414, 415 such that the memory region table 133 indicates that access to the realms 414, 415 is only to be permitted to that process, or any other processes indicated by the owner process. Therefore, the owner process of the realm 414, 415 has the right to exclude other processes (including for example an untrusted hypervisor) from accessing the realms 414, 415.

Figure 5:
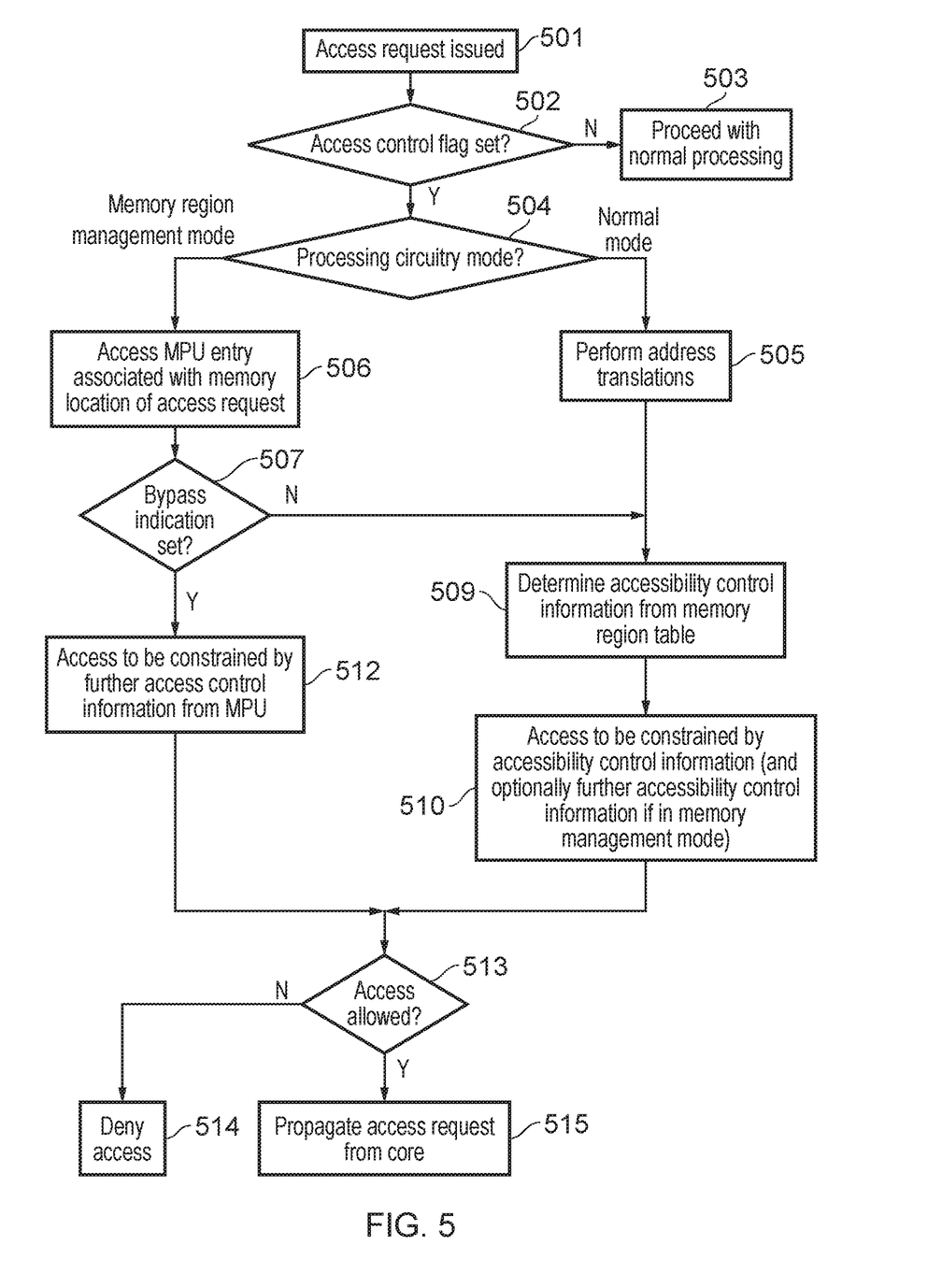
FIG. 5 is a flowchart illustrating a method implemented by a data processing apparatus in accordance with one example implementation.

FIG. 5 is a flowchart illustrating a method implemented by the data processing apparatus 10 in accordance with one example implementation. At step 501, an access request is issued by the processing circuitry 111 specifying a memory location for which access is requested. By way of example, the access request could be a read request for a location in memory.

At step 502, the access control flag, also known as the global enable flag, is checked. If the access control flag is unset, this indicates that the data processing apparatus 10 is to proceed with normal processing as indicated in step 503 and the techniques by which the memory region table 133 is used to constrain the access or is bypassed are not used.

The processing circuitry 111 is operable in a normal mode and a memory region management mode. Step 504 shows how the access is handled differently in dependence on whether the processing circuitry is operating in the normal mode or the memory region management mode, in situations where the access control flag is set.

If the processing circuitry 111 is operating in the normal mode, the flow proceeds to step 505 whereupon address translation from the form of address specified in the access request, which may be a virtual address or an intermediate physical address, to a physical address takes place. The address translation step 505 may also involve some access control checks whereby the higher privilege processes can effectively police access by those executing at a lower privilege level.

If instead the processing circuitry 111 were operating in the memory region management mode, the flow proceeds to step 506. In step 506, the access control mechanism 115 accesses the MPU 114 and identifies an entry in the MPU 114 associated with the memory location specified in the access request.

At step 507, the bypass indication in the MPU entry is checked. If the bypass indication is not set, the access request is treated in the same manner as for an access request originating from the processing circuitry 111 in the normal mode and proceeds to steps 509 and 510. At step 509 the access control mechanism 115 determines accessibility control information from the memory region table 133 relating to the requested memory location. At step 510, the access control mechanism 115 determines that access to the memory 130 is to be constrained using the accessibility control information defined in the memory region table 133.

Optionally, at step 510, if the processing circuitry 111 is operating in the memory region management mode, the access to memory 13 can be constrained based on further accessibility control information defined in the MPU 114 in addition to the accessibility control information defined in the memory region table 133.

However, if at step 507 it was determined that the bypass indication in the MPU entry was set, the flow proceeds to step 512. In this implementation, as depicted in step 512, the MPU 114 stores further accessibility control information which is used to constrain the access to memory 130 in this case.

At step 513, it is determined whether access is allowed to proceed. If the access is not allowed as determined by either the further accessibility control information in the MPU 114, the accessibility control information in the memory region table 133, or a combination of both the accessibility control information and the further accessibility control information, then access is denied as shown in step 514. If the access is allowed to proceed, the access request is propagated from the core 110 to memory access circuitry 120. However, as discussed earlier the accessibility control information or further accessibility control information may constrain the access in ways other than just based on whether the access is permitted. As such, there may be additional constraints under which the access is to be processed which the data processing apparatus 10 is arranged to ensure are carried out.

Figure 6:
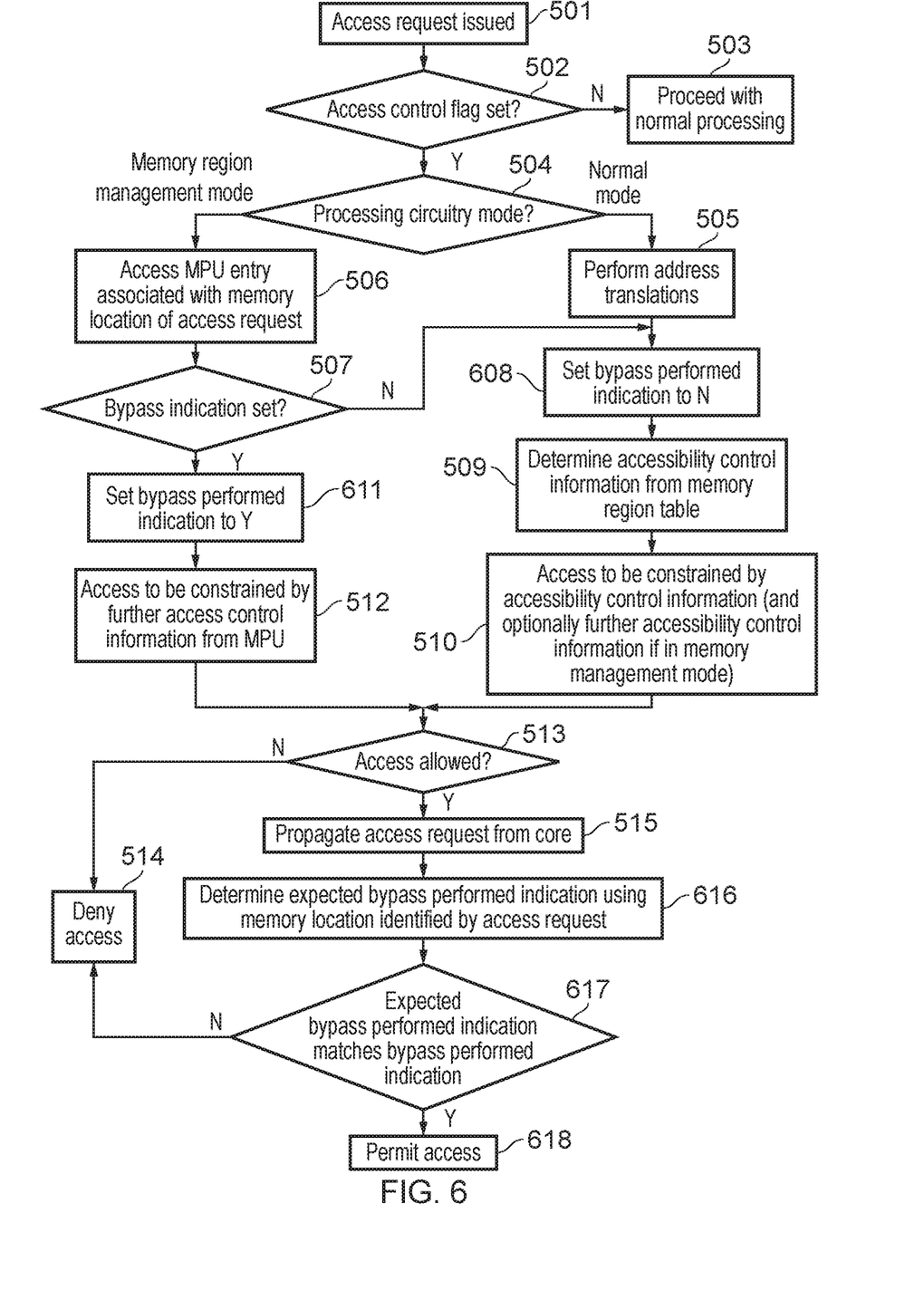
FIG. 6 is a flowchart illustrating a method implemented by a data processing apparatus in accordance with another example implementation.

FIG. 6 is a flowchart illustrating a method implemented by the data processing apparatus 10 in accordance with an implementation whereby the bypass performed indication check is performed.

The flowchart of FIG. 6 is similar to that depicted in FIG. 5 with corresponding steps in FIG. 5 and FIG. 6 sharing the same numbering. The steps appearing in both FIG. 5 and FIG. 6 will not be described in detail below as it will be appreciated that the description provided in relation to FIG. 5 applies similarly to FIG. 6.

In order to implement the bypass performed check, step 611 is introduced. When operating in the memory region management mode and if it is determined that the bypass indication has been set in the MPU 114, at step 611 a bypass performed indication in the access request is set to a YES state to indicate to the memory access circuitry 120 that the access has been processed unconstrained by the accessibility control information defined in the memory region table 133.

Similarly, when the processing circuitry 111 is operating in the normal mode or the processing circuitry 111 is operating in the memory region management mode and the bypass indication is unset in the MPU 114, the bypass performed indication in the access request is set to a NO state to indicate to the memory access circuitry 120 that the access has been processed constrained by the accessibility control information defined in the memory region table 133.

To produce a value against which to check the bypass performed indication, the memory access circuitry 120 is arranged, in response to receiving the access request propagated from the core 110, to determine an expected bypass performed indication as shown in step 616. By identifying the memory location specified by the access request, the memory access circuitry 120 can determine whether it is expected that that region of memory would correspond to private memory. If the memory location is determined as being in a region of private memory, the memory access circuitry sets the expected bypass performed indication to a YES state to indicate that it is expected that the access request should have been processed independently of the accessibility control information defined in the memory region table 133. On the other hand, the expected bypass performed indication is set to a NO state if the memory location specified by the access request is in a region that does not correspond to private memory.

At step 617, the expected bypass performed indication generated by the memory access circuitry 120 is compared to the bypass performed indication specified in the access request. If the expected bypass performed indication matches the bypass performed indication, the access is permitted as shown in step 618. However, if the bypass performed indication differs from the expected bypass performed indication, access is denied as shown in step 514. Hence, this check ensures that regions of memory for which it is expected that the access would be constrained by the memory region table are only accessed when constrained by the memory region table and regions of memory which should only be accessed when the processing circuitry 111 is in memory region management mode, are not somehow accessed by the processing circuitry 111 operating in the normal mode.

In accordance with the techniques described herein there is provided an apparatus and method for implementing access control for access requests whereby a memory region table is provided defining information as to how access to memory regions is to be constrained. Thus the security of these memory regions can be enforced with the memory region table able to exclude certain processes from accessing regions of memory. The present techniques also provide a mechanism by which the checks based on the memory region table can be bypassed by first referencing an MPU to ascertain whether the memory region table should be consulted or not. In this way, a secure means for providing access to regions of memory that would otherwise be indicated as inaccessible is provided.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A data processing apparatus comprising:
   processing circuitry to perform data processing operations, wherein when performing the data processing operations the processing circuitry is arranged to seek to access data stored in memory;
   a memory region table to define accessibility control information for each of a number of memory regions within the memory;
   an access control mechanism to control access to the memory in response to an access request issued by the processing circuitry;
   wherein the processing circuitry is configured to operate in a normal mode and a memory region management mode; and
   a memory protection unit referenced by the access control mechanism when the processing circuitry is operating in the memory region management mode, the memory protection unit providing a bypass indication for one or more memory regions in the memory;
   wherein the access control mechanism is arranged, when the processing circuitry is operating in the normal mode, to constrain access to a memory location identified by the access request based on the accessibility control information defined in the memory region table for a memory region containing the memory location; and wherein the access control mechanism is arranged, when the processing circuitry is operating in the memory region management mode, to reference the memory protection unit, and when the bypass indication is set for the memory region containing the memory location identified by the access request, to process the access to the memory location unconstrained by the memory region table.

2. The data processing apparatus of claim 1, wherein:
the accessibility control information stored in the memory region table is maintained by the processing circuitry when operating in the memory region management mode.

3. The data processing apparatus of claim 1, wherein:
the memory protection unit defines further accessibility control information for the one or more regions in the memory; and
the access control mechanism is arranged, when the processing circuitry is operating in the memory region management mode and when the bypass indication is set, to control access to the memory location identified by the access request taking into account the further accessibility control information defined in the memory protection unit for the memory region containing the memory location.

4. The data processing apparatus of claim 1, wherein:
the access control mechanism is arranged, when the processing circuitry is operating in the memory region management mode and when the bypass indication is unset, to control access to the memory location identified by the access request taking into account the accessibility control information defined in the memory region table for the memory region containing the memory location.

5. The data processing apparatus of claim 1, wherein:
the memory protection unit defines further accessibility control information for the one or more regions in the memory; and
the access control mechanism is arranged, when the processing circuitry is operating in the memory region management mode and when the bypass indication is unset, to control access to the memory location identified by the access request taking to account a combination of the accessibility control information defined in the memory region table for the memory region containing the memory location, and the further accessibility control information defined in the memory protection unit for the memory region containing the memory location.

6. The data processing apparatus of claim 5, wherein:
the further accessibility control information comprises at least one of permission information and attribute information that is combined with the accessibility control information obtained from the memory region table.

7. The data processing apparatus of claim 1, wherein:
the accessibility control information in the memory region table comprises ownership information indicating, for a given memory region within the memory, which of a plurality of processes executable by the processing circuitry is an owner process that has control of access to that given memory region.

8. The data processing apparatus of claim 7, wherein:
the processing circuitry is arranged to be operable in a plurality of realms, when operating in a given realm the processing circuitry is executing an associated process that has control of access to a block of physical addresses forming an associated memory region, and the ownership information comprises, for the given memory region, realm information identifying which realm that given memory region is associated with.

9. The data processing apparatus of claim 8, wherein:
the processing circuitry incorporates a realm management unit to perform realm management operations when the processing circuitry is operating in the memory region management mode.

10. The data processing apparatus of claim 9, wherein:
when performing the realm management operations, the realm management unit is arranged to issue the access request to modify the accessibility control information defined in the memory region table; and
the bypass indication in the memory protection unit is set for each memory region storing the memory region table, and access to the memory region table in response to the access request issued by the realm management unit is unconstrained by the memory region table.

11. The data processing apparatus of claim 9, wherein:
the bypass indication in the memory protection unit is set for each memory region storing code executed by the realm management unit when performing the realm management operations and access to the code executed by the realm management unit when performing the realm management operations is unconstrained by the memory region table.

12. The data processing apparatus of claim 1, further comprising:
memory access circuitry responsive to receiving an access request from the access control mechanism to access the data stored in the memory location identified access the memory;
wherein the access request specifies a bypass performed indication indicative of whether the access control mechanism processed the access to the memory location constrained by the memory region table,
the memory access circuitry in response to the received access request is arranged to determine based on the memory location identified by the received access request an expected bypass performed indication; and
when the bypass performed indication differs from the expected bypass performed indication, the memory access circuitry is arranged to deny access to the memory location.

13. The data processing apparatus of claim 12, wherein:
the memory access circuitry is configured to determine the expected bypass performed indication as indicating the access was unconstrained by the memory region table when the memory location identified by the received access request corresponds to a private memory region.

14. The data processing apparatus of claim 1, further comprising:
an access control flag wherein, when the access control flag is clear, the access control mechanism is disabled and access to the memory is not constrained by the memory region table.

15. A method of operating a data processing apparatus, the method comprising:
performing, by processing circuitry, data processing operations;

storing data accessed by the processing circuitry when performing the data processing operations in a memory;

defining accessibility control information for each of a number of memory regions within the memory in a memory region table;

controlling, in response to an access request issued by the processing circuitry, access to the memory by:

when the processing circuitry is operating in a normal mode, constraining access to a memory location identified by the access request based on the accessibility control information defined in the memory region table for a memory region containing the memory location; and when the processing circuitry is operating in a memory region management mode, referencing a memory protection unit, the memory protection unit providing a bypass indication for one or more memory regions in the memory, and when the bypass indication is set for the memory region containing the memory location identified by the access request, processing the access to the memory location unconstrained by the memory region table.

16. A data processing apparatus comprising:

processing means for performing data processing operations, wherein when performing the data processing operations the processing means is arranged to seek to access data stored in memory means;

memory region table means for defining accessibility control information for each of a number of memory regions within the memory means;

access control means for controlling, in response to an access request issued by the processing means, access to the memory means;

wherein the processing means is configured to operate in a normal mode and a memory region management mode;

wherein the access control means is arranged, when the processing means is operating in the normal mode, to constrain access to a memory location identified by the access request based on the accessibility control information defined in the memory region table means for a memory region containing the memory location; and wherein the access control means is arranged, when the processing means is operating in the memory region management mode, to reference a means for protecting memory, the means for protecting memory providing a bypass indication for one or more memory regions in the memory means, and when the bypass indication is set for the memory region containing the memory location identified by the access request, to process the access to the memory location unconstrained by the memory region table means.

* * * * *